(12) United States Patent
Liu

(10) Patent No.: US 11,872,943 B1
(45) Date of Patent: Jan. 16, 2024

(54) SEAT ORGANIZER BRACKET FOR VEHICLE

(71) Applicant: Foshan Chengfang Technology Co., Ltd., Foshan (CN)

(72) Inventor: Wenbiao Liu, Foshan (CN)

( * ) Notice: Subject to any disclaimer, the term of this patent is extended or adjusted under 35 U.S.C. 154(b) by 0 days.

(21) Appl. No.: 18/476,243

(22) Filed: Sep. 27, 2023

(30) Foreign Application Priority Data

Aug. 30, 2023 (CN) .......................... 202322345507.8

(51) Int. Cl.
  *B60R 11/00* (2006.01)
  *B60R 11/02* (2006.01)

(52) U.S. Cl.
  CPC ........... *B60R 11/00* (2013.01); *B60R 11/0241* (2013.01); *B60R 2011/0007* (2013.01); *B60R 2011/0012* (2013.01); *B60R 2011/0071* (2013.01); *B60R 2011/0082* (2013.01)

(58) Field of Classification Search
  CPC ....... B60R 2011/003; B60R 2011/0007; B60R 2011/0012; B60R 2011/0014; B60R 2011/0075; B60R 2011/0071; B60R 2011/0082; B60R 11/0241
  USPC ................................................. 224/556, 929
  See application file for complete search history.

(56) References Cited

U.S. PATENT DOCUMENTS

| | | | | |
|---|---|---|---|---|
| 5,903,133 A * | 5/1999 | Amero, Jr. ............ | H02J 7/0044 | 320/113 |
| 6,062,518 A * | 5/2000 | Etue ................... | B60R 11/0241 | 248/231.21 |
| 6,827,318 B1 * | 12/2004 | Hsu Li .................. | F16M 13/00 | 224/558 |
| 7,668,309 B2 * | 2/2010 | Wilcox ............... | B60R 11/0241 | 379/454 |
| 7,868,585 B2 * | 1/2011 | Sarnowsky ............. | H02J 50/10 | 320/108 |
| 8,061,670 B1 * | 11/2011 | White ...................... | B60N 3/10 | 248/311.2 |
| 8,387,790 B2 * | 3/2013 | Conner .................. | A45C 11/00 | 206/320 |
| 8,922,354 B2 * | 12/2014 | Nagara .................. | G06F 3/016 | 340/407.1 |
| 8,998,048 B1 * | 4/2015 | Wu ........................ | F16M 13/02 | 224/443 |
| 9,162,630 B2 * | 10/2015 | Pluta ...................... | B60R 11/02 | |
| 10,155,482 B2 * | 12/2018 | Corso .................. | H04B 1/3877 | |
| D873,205 S * | 1/2020 | MacNeil ...................... | D12/415 | |
| D877,043 S * | 3/2020 | MacNeil ...................... | D12/415 | |
| D878,279 S * | 3/2020 | MacNeil ...................... | D12/415 | |
| 10,576,905 B1 * | 3/2020 | MacNeil ............ | H04B 1/3888 | |
| 10,717,396 B2 * | 7/2020 | MacNeil ............ | B60R 11/0241 | |
| 10,933,815 B1 * | 3/2021 | Khubani ............ | B60R 11/0241 | |

(Continued)

*Primary Examiner* — Justin M Larson

(57) ABSTRACT

Provided is a seat organizer bracket for a vehicle, including: a storage box for supporting a tablet and storing items, and a connection cup holder for connecting a seat of the vehicle; wherein the connection cup holder is detachably connected to the storage box; the storage box includes a container body and a lid; an end of the lid is hingedly connected to the container body through a lid bearing; a hidden tensile clamp arm structure is arranged in the lid for clamping the tablet; a bottom bracket is arranged on a lower end of the lid for supporting the tablet; the connection cup holder is arranged with an extension arm, and the extension arm 24 is adjustable to lock the connection cup holder into a saucer with different sizes of the seat.

10 Claims, 9 Drawing Sheets

(56) References Cited

U.S. PATENT DOCUMENTS

| | | | | |
|---|---|---|---|---|
| D920,219 S | * | 5/2021 | Iverson | D12/415 |
| 11,038,996 B2 | * | 6/2021 | Iverson | H04M 1/04 |
| 11,117,526 B2 | * | 9/2021 | Iverson | B60R 11/02 |
| 11,148,599 B2 | * | 10/2021 | Salvia, III | B60R 11/02 |
| 11,192,486 B2 | * | 12/2021 | Chen | B60N 3/103 |
| D972,549 S | * | 12/2022 | Yang | D12/419 |
| D985,471 S | * | 5/2023 | Yang | D12/419 |
| D993,893 S | * | 8/2023 | Xie | D12/419 |
| D1,004,524 S | * | 11/2023 | Liu | D12/419 |
| D1,004,525 S | * | 11/2023 | Liu | D12/419 |
| 2023/0254394 A1 | * | 8/2023 | Nguyen | H04M 1/04 455/575.1 |

* cited by examiner

SEAT ORGANIZER BRACKET FOR VEHICLE

CROSS REFERENCE

The present disclosure claims priority of Chinese Patent Application No. 202322345507.8, filed on Aug. 30, 2023, the entire contents of which are hereby incorporated by reference in their entirety.

TECHNICAL FIELD

The present disclosure relates to the technical field of vehicle seat holders, especially a seat organizer bracket for vehicle.

BACKGROUND

Currently, car travel has become part of people's lives. Especially for children in the back seat of the car, using tablets, play with toys, eating snacks, and other activities in the car are more and more common, and these things will be scattered everywhere in the car, which leads to poor experience and on the premise of safety and comfort. Further, heavy tablets in the hand for a long time will be uncomfortable, toys can't be easily accessed by placing them everywhere, there's no place to put leftover snacks, and so on. Therefore, a storage container that can both hold objects and support tablets can free up children's hands, and also allow objects to be stored in the container within easy reach.

Existing storage containers with tablet support in the market can make the tablet stably supported only when the car stops, and there is no clamping device. Once the car runs in the process of bumps, the tablet will be very easy to fall down. Further, the cup holder of the container, to be fixed to the seat, forms a one-piece structure with the container, such that the size of the container cannot be adjusted. That is, the container with a fixed volume is fixed only by tucking into a saucer of the seat. When the size of the cup holder is not suitable, the container may not be fixed securely and may be fall down. In addition, the lid of the container is closed by means of a buckle, and repeated use may lead to malfunction. Further, the containers and the fixed base are of the one-piece structure and cannot be detached, such that the overall volume is relatively large, which is inconvenient to store and take up space.

Therefore, there is still need to improve the existing technology.

SUMMARY OF THE DISCLOSURE

The purpose of the present disclosure is to provide a seat organizer bracket for vehicle, which is intended to solve the technical problems that the existing car seat bracket does not have the function of storing snacks, and that there is no tablet fixing device that causes the tablet to be easily tipped over.

To achieve the above purpose, the present disclosure provides a seat organizer bracket for a vehicle, including: a storage box for supporting a tablet and storing items, and a connection cup holder for connecting a seat of the vehicle; wherein the connection cup holder is detachably connected to the storage box; the storage box includes a container body and a lid; an end of the lid is hingedly connected to the container body through a lid bearing; a hidden tensile clamp arm structure is arranged in the lid for clamping the tablet; a bottom bracket is arranged on a lower end of the lid for supporting the tablet; the connection cup holder is arranged with an extension arm, and the extension arm 24 is adjustable to lock the connection cup holder into a saucer with different sizes of the seat.

In some embodiments, the hidden tensile clamp arm structure includes a clamp body, a clamp arm, and a tension spring; an end of the tension spring is connected to the lid, and the other end of the tension spring is connected to a tension spring fixing post arranged in the clamp body; the clamp arm is hingedly connected to an outer end of the clamp body through a clamp body bearing and a torsion spring.

In some embodiments, the lid includes a lid body and a front plate, and the front plate is snap-connected to the lid body.

In some embodiments, an inner wall of the lid body is arranged with a plurality of slant top female-fasteners, around an edge of the inner wall, for the front plate to be snap-locked, and a front end of the lid body defines a lid outlet configured for the clamp body to be stretched from.

In some embodiments, the lid outlet is arranged with a magnet slot on each of both sides of the lid outlet, with a magnet block embedded in the magnet slot.

In some embodiments, a front port of the container body is arranged with an iron block slot, and an iron block is arranged in the iron block slot.

In some embodiments, a back surface of the front plate is arranged with a guide rail for guiding the clamp body to stretch, and a lower end of the back surface of the front plate is arranged with another tension spring fixing post located in the middle along a width of the guide rail; the back surface of the front plate is further arranged with a plurality of slant top male-fasteners, near an edge of the back surface, that are matched to be snap-connected with the plurality of slant top female-fasteners; a guide post is arranged in the middle of an inner wall of the lid body for restricting a displacement of the clamp body, and the guide post is fixedly connected to the front plate by means of a self-tapping screw.

In some embodiments, the connection cup holder includes a cup holder, a knob, an extension arm, and a container connector; the extension arm is arranged on a circumference of the cup holder and is extendable inwardly and outwardly, the knob is rotatably arranged on an upper end of the cup holder and is configured to drive the extension arm to extend inwardly and outwardly, and the container connector is screwed and fixed to a top of the cup holder.

In some embodiments, an upper end of the container connector is arranged with a connector female-fastener and a latch notch, the latch notch being interconnected with the connector female-fastener, and the connector female-fastener is further arranged with a latch tab.

In some embodiments, a connection port is arranged at a bottom of a front end of the container body to be connected with the container connector, and an inner wall of the connection port is arranged with a connector male-fastener.

Beneficial effect: In the present disclosure, the hidden tensile clamp arm structure is arranged on the lid, the clamp arm of the hidden tensile clamp arm structure is connected to the clamp body through the torsion spring, and the clamp body is connected to the lid through the tension spring. In this way, different sizes of tablets can be matched and clamped by freely stretching the arm structure to prevent the tablet from falling down. When not in use, the arm structure can be automatically retracted under the action of the spring to turn into the usual shape as a lid. In addition, the lid is designed to be fastened by magnetic suction, which has a long service life and a very natural and comfortable experience; further, it is not easy to malfunction in repeated use, avoiding the failure of the lid to be buckled up. The connection cup holder to be fixed to the saucer of the seat is adopted with a scheme with the extension arm capable of extending the outer edge of the cup holder, such that the extension length of the extension arm can be controlled by the knob, according to the different sizes of the saucer, to cause the connection cup holder to abut against the saucer, ensuring that the container can be firmly fixed in the saucer. The present disclosure further discloses a container connector, realizing a quick connection and locking of the container. When not needed, the container connector can be quickly removed, such that the overall volume is small, which is easy to store and does not take up space.

Figure 1:
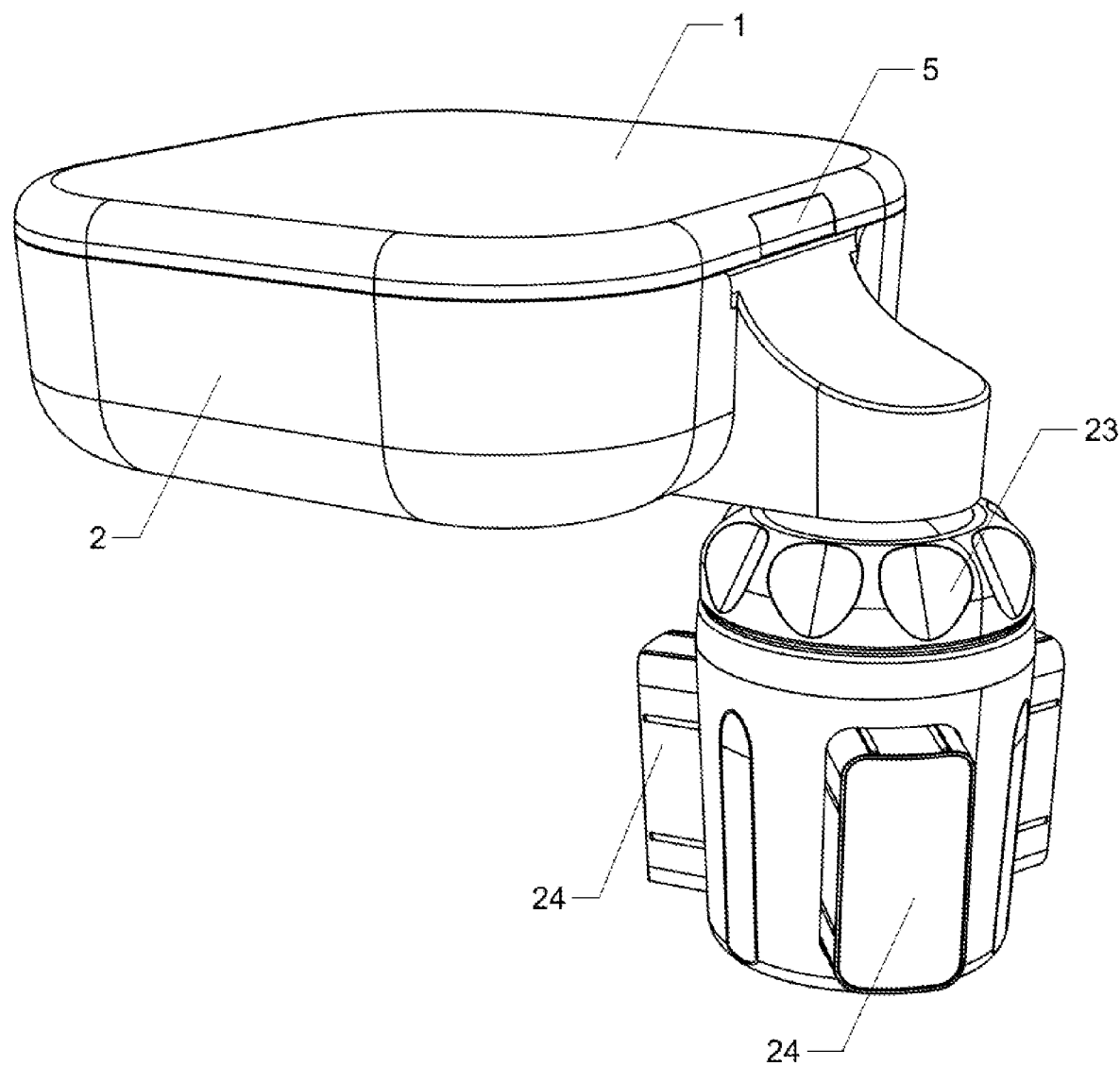
FIG. 1 is a schematic view of an overall structure according to the present disclosure.

REFERENCE NUMERALS 1, lid body; 2, container body; 3, front plate; 4, clamp body; 5, clamp arm; 6, bottom bracket; 7, bottom bracket silicone pad; 8, tension spring; 9, magnet block; 10, iron block; 11, self-tapping screw; 12, magnet slot; 13, iron block slot; 14, clamp arm silicone pad; 15, clamp body bearing; 16, torsion spring; 17, lid bearing; 18, bottom bracket female-fastener; 19, bottom bracket male-fastener; 20, slant top female-fastener; 21, slant top male-fastener; 22, container connector; 23, knob; 24, extension arm; 25, tension spring fixing post; 26, front plate outlet; 27, lid outlet; 28, limiting post; 29, connector male-fastener; 30, guide rail; 31, latch tab; 32, latch notch; 33, connector female-fastener; 34, stress hole; 35, connection port.

DETAILED DESCRIPTION

In order to make the purpose, technical solution, and advantages of the present disclosure clearer and more explicit, the present disclosure is described in further detail hereinafter with reference to the accompanying drawings and by way of embodiments.

Figure 2:
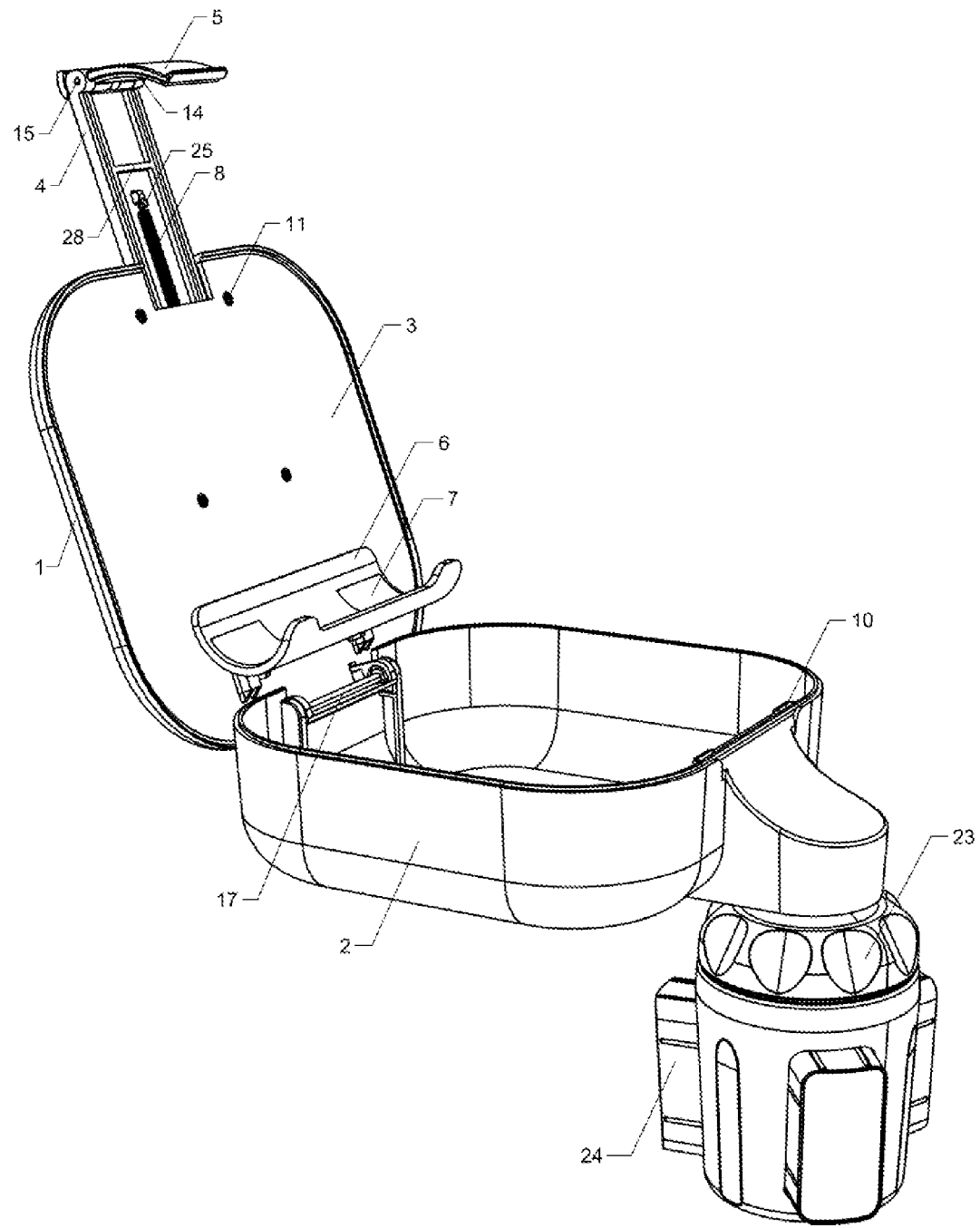
FIG. 2 is a structural schematic view in an opened state according to the present disclosure.
Figure 3:
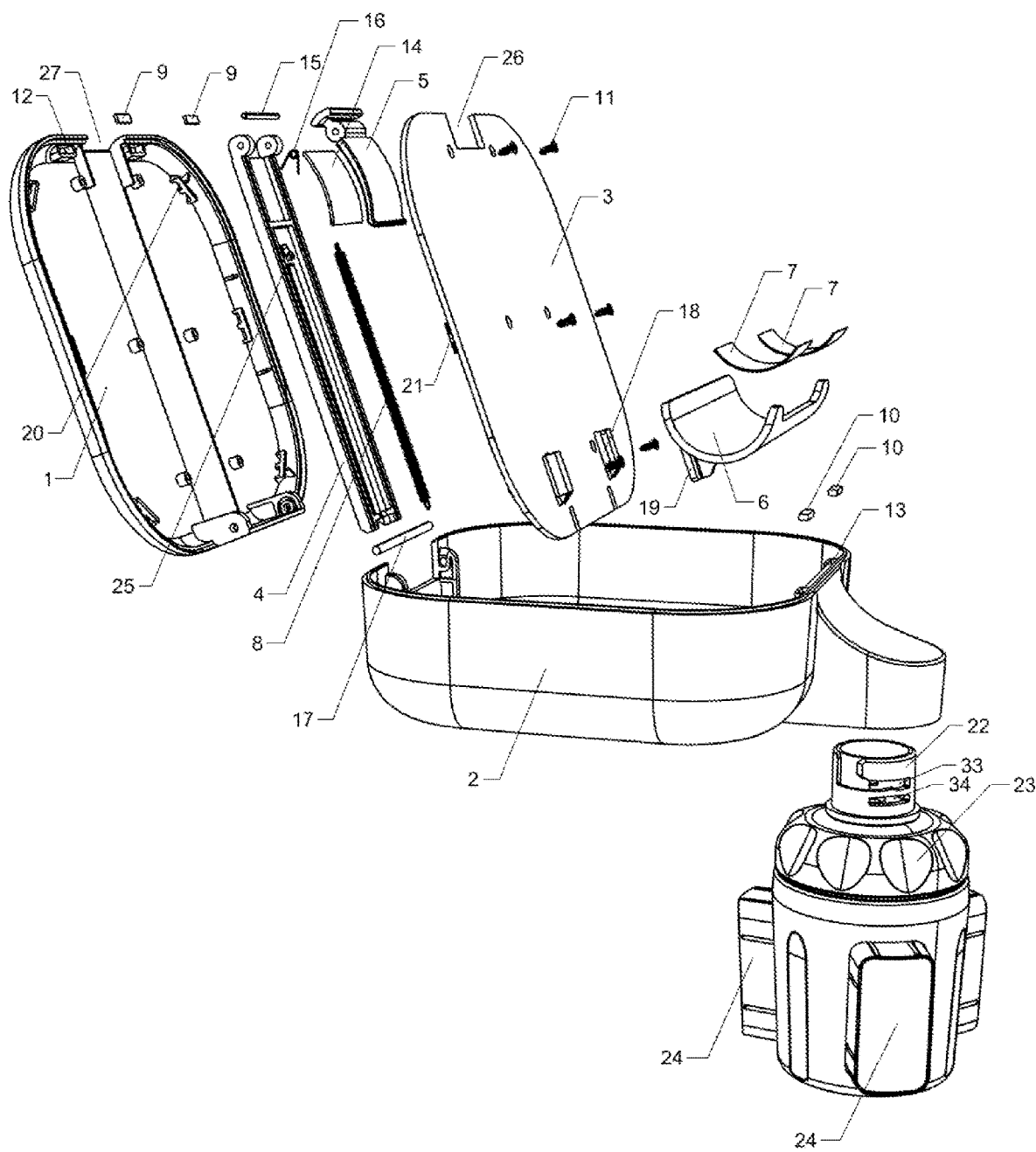
FIG. 3 is an exploded schematic view according to the present disclosure.
Figure 4:
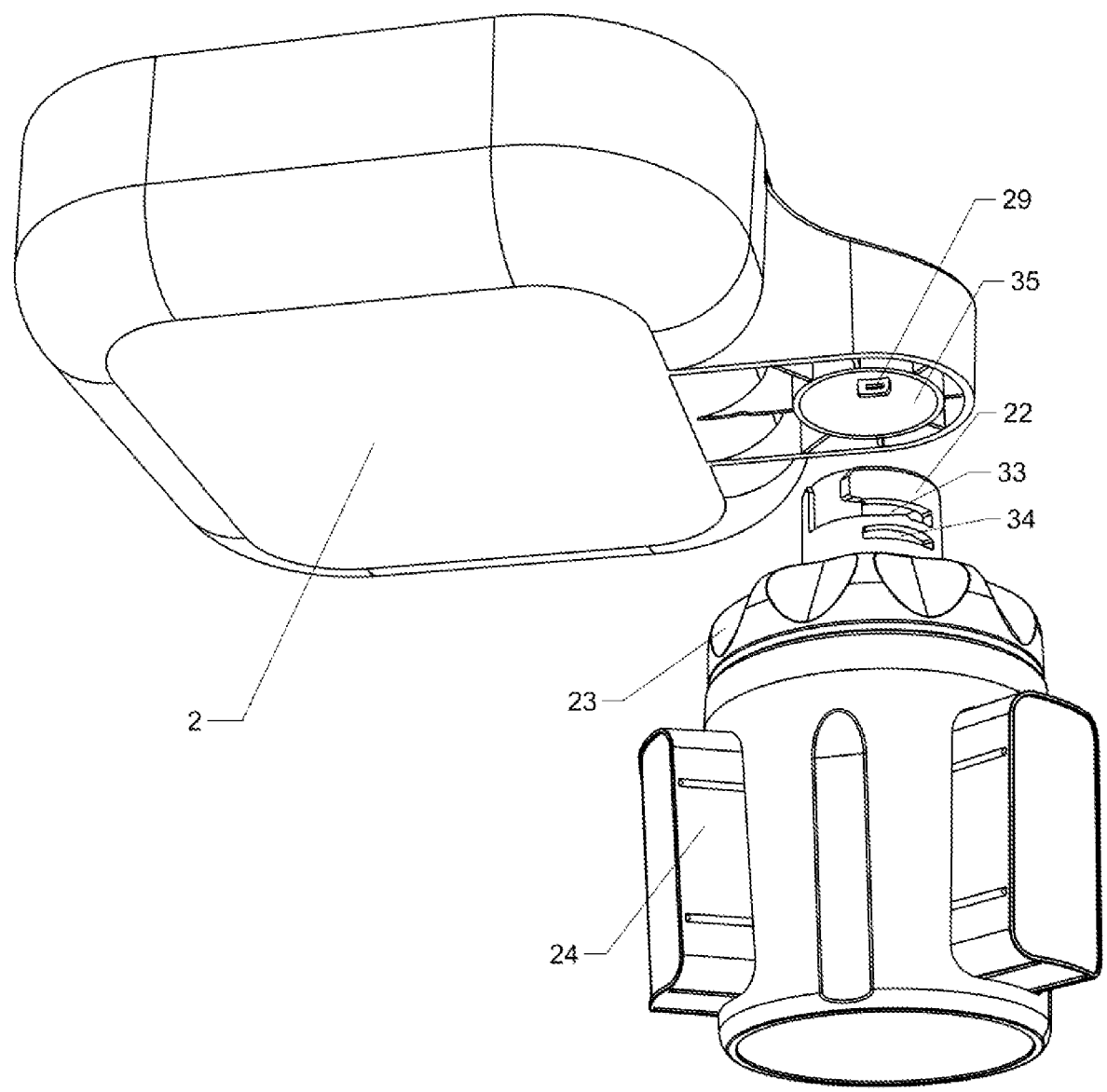
FIG. 4 is a perspective schematic view in a disassembled state according to the present disclosure.
Figure 5:
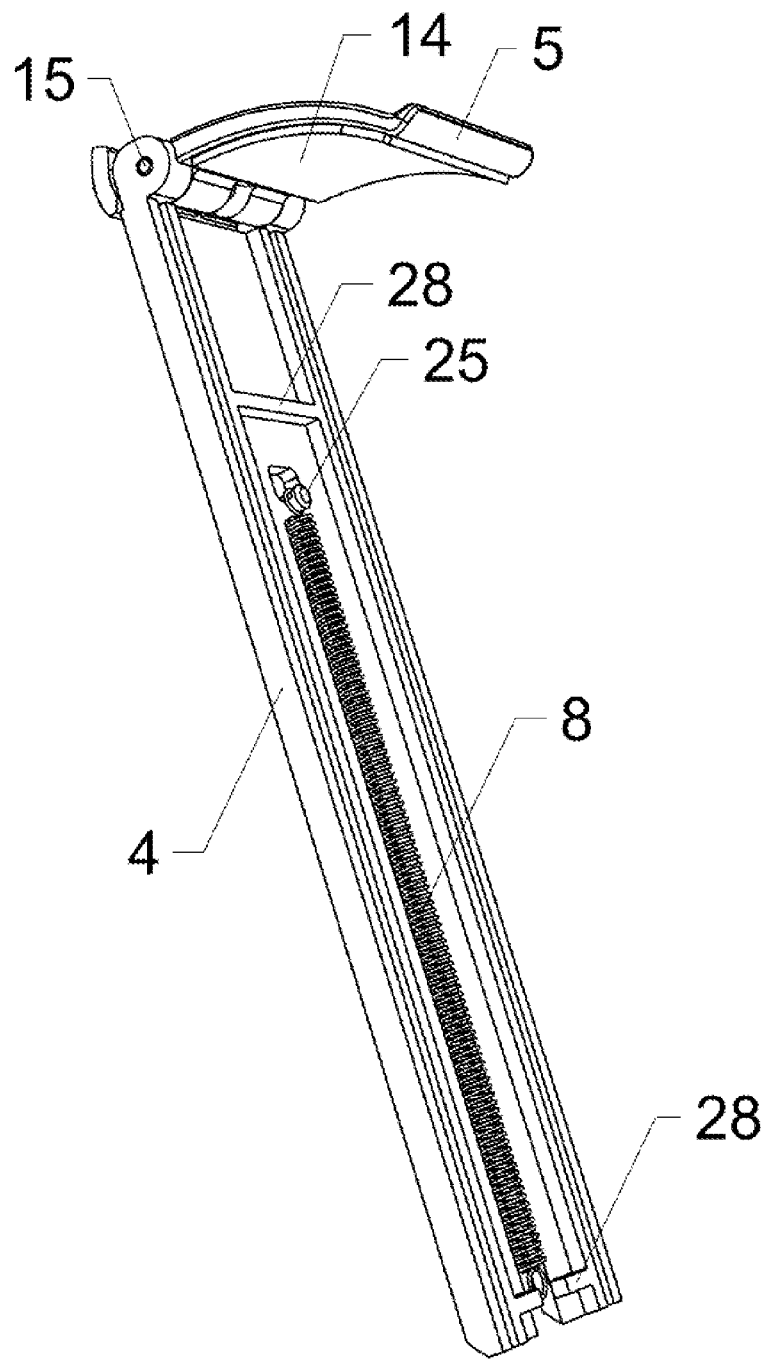
FIG. 5 is a perspective schematic view of a hidden tensile clamp arm structure according to the present disclosure.
Figure 6:
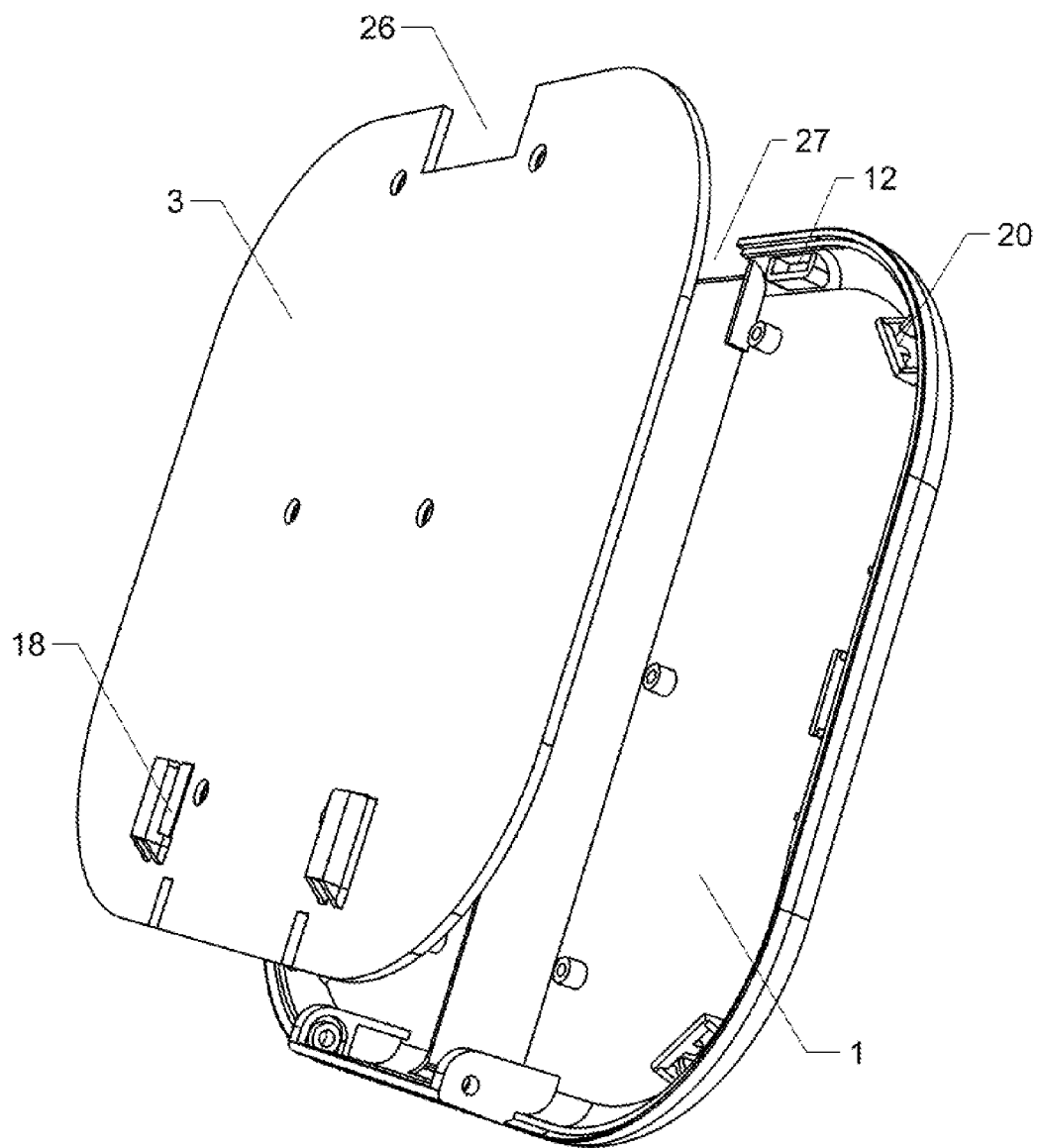
FIG. 6 is an exploded schematic view of a lid of the storage container according to the present disclosure.
Figure 7:
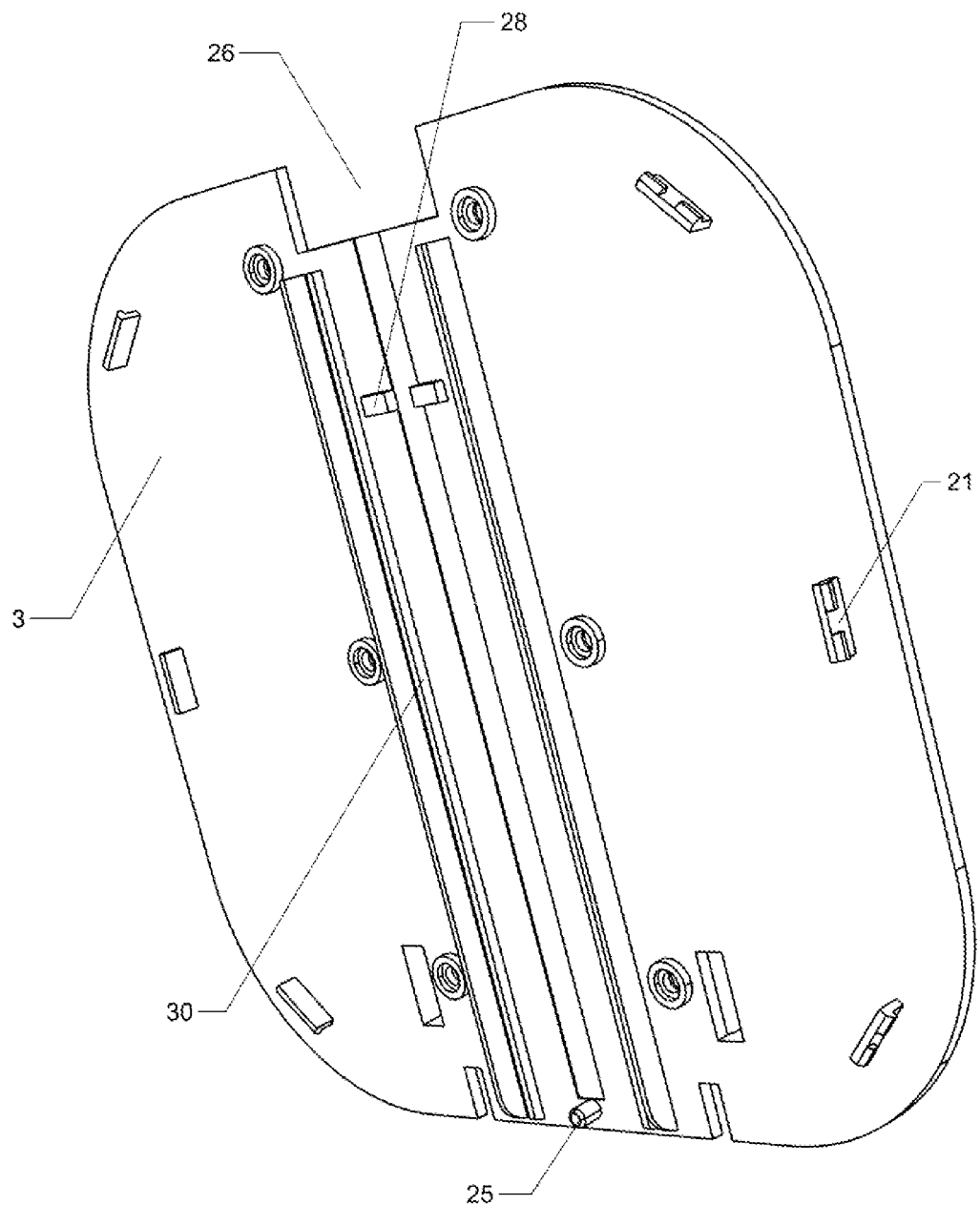
FIG. 7 is a perspective schematic view of a front plate of the lid according to the present disclosure.
Figure 8:
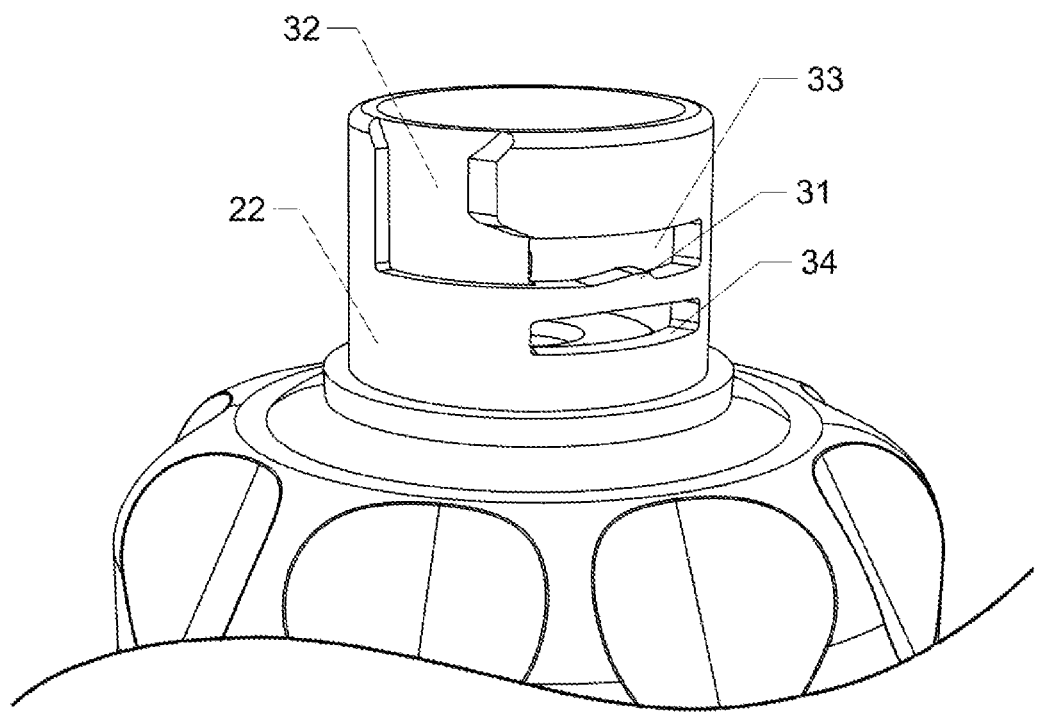
FIG. 8 is a partial schematic view of a connection cup holder according to the present disclosure.
Figure 9:
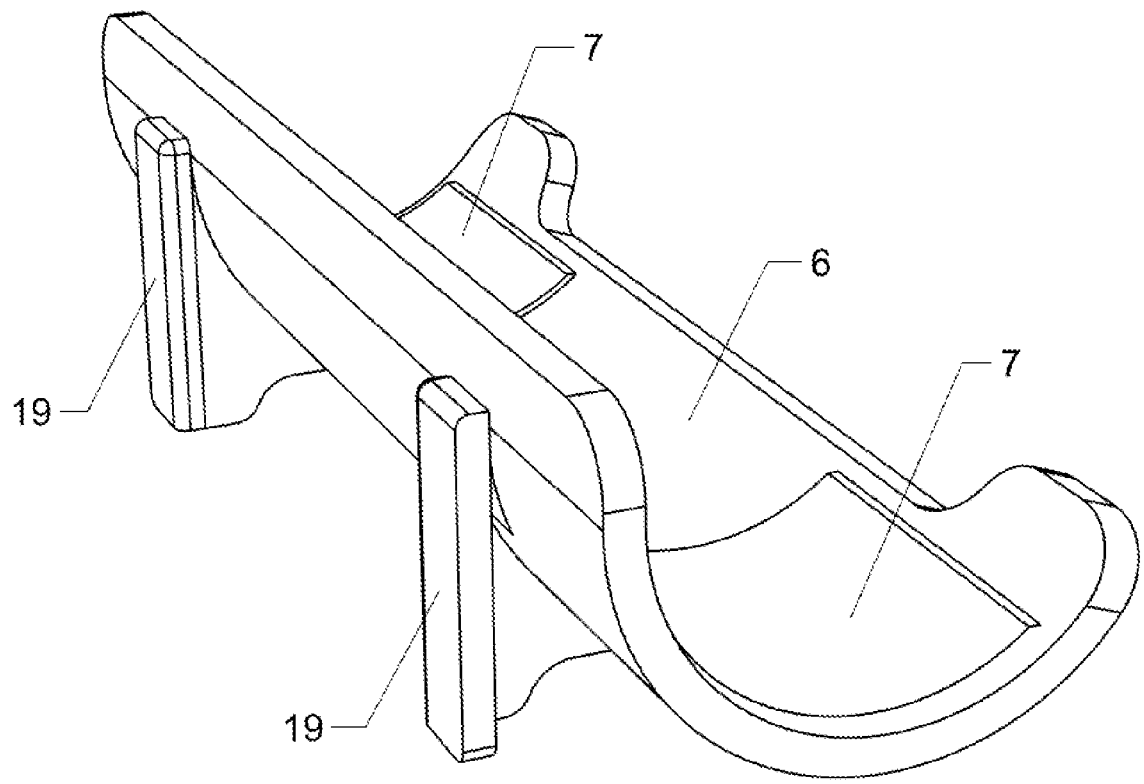
FIG. 9 is a perspective schematic view of a bottom bracket according to the present disclosure.

As shown in FIGS. 1-9, the present disclosure discloses a seat organizer bracket for vehicle including: a storage box for supporting a tablet and storing items, and a connection cup holder for connecting a child seat. In order to make the connection cup holder and the storage box easily disassembled and stowed, the connection cup holder is detachably connected to the storage box. Since the connection cup holder and the storage box are of a split design, the overall volume is smaller after disassembly, such that it is more convenient to be stowed, occupies less space, and is more portable. The storage box includes a container body 2 and a lid; an end of the lid is hingedly connected to the container body 2 through a lid bearing 17; a hidden tensile clamp arm structure is arranged in the lid for clamping the tablet; a bottom bracket 6 is arranged on a lower end of the lid for supporting the tablet. The hidden tensile clamp arm structure may cooperate with the bottom bracket 6, for clamping the tablet. Because the hidden tensile clamp arm structure has the function of stretching, different sizes of tablets can be matched and clamped by freely stretching the arm structure to prevent the tablet from falling down. When not in use, the arm structure can be automatically retracted under the action of the spring to turn into the usual shape as a lid. The above design may solve the problem that a traditional tablet bracket for a car seat does not have the clamping-fixing function, can only be used in the car in a stopped state, and cannot be used in the car in a moving state. In order to make the connection cup holder able to match various models of saucers of the seat to be inserted and fixed, the connection cup holder is arranged with an adjustable extension arm 24, and the connection cup holder can be locked into different sizes of saucers of the seat by adjusting the extension arm 24.

In some embodiments, the bottom bracket 6 is affixed with a bottom bracket silicone pad 7, configured for preventing the tablet from sliding, which plays the roles of anti-slip and of protection for a shell of the tablet.

Specifically, the hidden tensile clamp arm structure includes a clamp body 4, a clamp arm 5, and a tension spring 8; an end of the tension spring 8 is connected to the lid, and the other end of the tension spring 8 is connected to a tension spring fixing post 25 arranged in the clamp body 4; the clamp arm 5 is hingedly connected to an outer end of the clamp body 4 through a clamp body bearing 15 and a torsion spring 16; the end of the tension spring 8 is connected to another tension spring fixing post 25 arranged in the lid.

When in use, the clamp body 4 is stretched out, the clamp arm 5 is opened, and the tablet is placed on the bottom bracket 6; the clamp body 4 tends to retract under a reset force of the tension spring 8, and cooperates with the torsion spring 16 on the clamp arm 5 to realize the clamping and fixing of the tablet; when not in use, the clamp arm 5 is pulled open and the clamp body 4 is pulled outwardly to loosen the tablet, and the tablet is taken out; then the arm structure can be automatically retracted under the reset force of the tension spring 8 and the torsion spring 16, turning out as the usual shape of the lid, which does not occupy space and does not affect the overall aesthetic.

In some embodiments, a clamp arm silicone pad 14 is affixed on a surface of the clamp arm 5. By pasting the clamp arm silicone pad 14 on the surface of the clamp arm 5, when the tablet is clamped, the tablet cannot be easily slid loose in the process of movement and vibration of the car, and the shell of the tablet can also be protected.

In some embodiments, an upper end of the clamp body 4 is arranged with a limiting post 28. Specifically, the lid includes a lid body 1 and a front plate 3, and the front plate 3 is snap-connected to the lid body 1. Since the front plate 3 is snap-connected to the lid body 1, it is more convenient to assemble, and the hidden tensile clamp arm structure can be arranged internally to realize the concealment of the hidden tensile clamp arm structure, making the surface more beautiful after being opened.

Specifically, an inner wall of the lid body 1 is arranged with multiple slant top female-fasteners 20, around an edge of the inner wall, for the front plate 3 to be snap-locked, and a front end of the lid body 1 defines a lid outlet 27 from which the clamp body 4 is stretched; the front plate 3 defines a front plate outlet 26, and the front plate outlet 26 and the lid outlet 27 form an inlet/outlet for the hidden tensile clamp arm structure.

In some embodiments, in order to better install magnet blocks 9, the lid outlet 27 is arranged with a magnet slot 12 on each of both sides of the lid outlet 27, with a corresponding magnet block 9 embedded in the magnet slot 12.

In some embodiments, in order to cooperate with the magnet blocks 9 to realize a magnetic adsorption effect, a front port of the container body 2 is arranged with iron block slots 13, and an iron block 10 is arranged in a corresponding iron block slot 13.

With the above structure, through the magnetic effect of the magnet block 9 and the iron block, the opening and closing is realized by using magnetic adsorption, so as to make the opening and closing of the lid and the container body 2 smoother, thereby prolonging the service life.

In some embodiments, in order to make the clamp body better stretch and move inside the lid, a back surface of the front plate 3 is arranged with a guide rail 30 for guiding the stretching of the clamp body 4, and a lower end of the back surface of the front plate 3 is arranged with another tension spring fixing post 25, the tension spring fixing post 25 is located in the middle along a width of the guide rail 30; the back surface of the front plate 3 is arranged with multiple slant top male-fasteners 21, near an edge of the back surface, that are matched to be snap-connected with the slant top female-fasteners 20; a guide post is arranged in the middle of an inner wall of the lid body 1 for restricting the displacement of the clamp body, and the guide post is fixedly connected to the front plate 3 by means of a self-tapping screw 11. The guide post and the self-tapping screw make the fixing between the front plate 3 and the lid body 1 more solid, as well as make the clamp body 4 of the hidden tensile clamp arm structure more stable during stretching and contraction. The use of the slant top male-fastener 21 and the slant top female-fastener 20 cooperate with each other for snap fixing, such that the assembly of the front plate 3 and the lid body 1 is more convenient.

In some embodiments, an upper surface of the front plate 3 is arranged with a bottom bracket female-fastener 18, and the bottom bracket 6 is fixedly connected to the bottom bracket female-fastener 18 by inserting, the bottom bracket 6 is arranged with a bottom bracket male-fastener 19 corresponding to the bottom bracket female-fastener 18 to be inserted and fixed; the bottom bracket 6 is affixed with a bottom bracket silicone pad 7 for preventing the tablet from sliding, which serves as an anti-slip function.

The back surface of the front plate 3 is further arranged with a limiting post 28 for limiting the length of stretching of the clamp body and preventing the clamp body from being completely pulled out to the outside of the lid outlet 27.

In some embodiments, the connection cup holder includes a cup holder, a knob 23, an extension arm 24, and a container connector 22; the extension arm 24 is arranged on a circumference of the cup holder and is extendable inwardly and outwardly, the knob 23 is rotatably arranged on an upper end of the cup holder and is configured to drive the extension arm 24 to extend inwardly and outwardly; the container connector 22 is fixed to a top of the cup holder and is configured to enable the container to be detached quickly; the extension arm 24 can be controlled to extend outwardly or inwardly through the rotation of the knob 23, so as to be fixed to the saucer of the seat, realizing that the cup holder can be locked into the saucer of different sizes.

In some embodiments, the number of the extension arms 24 is three.

In some embodiments, an upper end of the container connector 22 is arranged with a connector female-fastener 33 and a latch notch 32, the latch notch 32 being interconnected with the connector female-fastener 33, and the connector female-fastener 33 is further arranged with a latch tab 31. In some embodiments, the container connector 22 is defines a stress hole 34. A connection port 35 is arranged at a bottom of a front end of the container body 2 to be connected with the container connector 22, and an inner wall of the connection port 35 is arranged with a connector male-fastener 29.

During installation, the connector male-fastener 29 of the container body 2 is inserted along the latch notch 32 and then rotated such that the connector male-fastener 29 rotates into the connector female-fastener 33 and is locked by the latch tab 31 to prevent the connector male-fastener 29 from turning outwardly and loose. The latch tab 31 is forced to deform up and down in the stress hole under the action of a certain internal and external rotational force exerted by the connector male-fastener 29, so as to achieve the function of locking and unlocking the connector male-fastener 29. During disassembling, the latch tab 31 is forced to deform up and down in the stress hole under the action of a certain internal and external rotational force exerted by the connector male-fastener 29, such that the connector male-fastener 29 can be rotated along the connector female-fastener 33 and then rotate outwardly to rotate the connector male-fastener 29 to the latch notch 32, and finally moved upwardly to realize disassembling the container body 2. Therefore, the installation and disassembling may be simpler and more convenient.

In the present disclosure, the hidden tensile clamp arm structure is arranged on the lid, the clamp arm 5 of the hidden tensile clamp arm structure is connected to the clamp body through the torsion spring 16, and the clamp body is connected to the lid through the tension spring 8. In this way, different sizes of tablets can be matched and clamped by freely stretching the arm structure to prevent the tablet from falling down. When not in use, the arm structure can be automatically retracted under the action of the spring to turn into the usual shape as a lid. In addition, the lid is designed to be fastened by magnetic suction, which has a long service life and a very natural and comfortable experience; further, it is not easy to malfunction in repeated use, avoiding the failure of the lid to be buckled up. The connection cup holder to be fixed to the saucer of the seat is adopted with a scheme with the extension arm 24 capable of extending the outer edge of the cup holder, such that the extension length of the extension arm 24 can be controlled by the knob 23, according to the different sizes of the saucer, to cause the connection cup holder to abut against the saucer, ensuring that the container can be firmly fixed in the saucer. The present disclosure further discloses a container connector 22, realizing a quick connection and locking of the container. When not needed, the container connector can be quickly removed, such that the overall volume is small, which is easy to store and does not take up space.

The usage scenes of the proposed product are not only for a child seat, but also a saucer of a rear seat of a car, a saucer of a baby stroller, etc.

The above is some implementations of the present disclosure, and cannot be considered to limit the scope of the present disclosure. It should be pointed out that, for those skilled in the art, the modification or equivalent replacement of the technical solution of the present disclosure without creative labor is within the scope of the technical solution of the present disclosure.

What is claimed is:

1. A seat organizer bracket for a vehicle, comprising: a storage box for supporting a tablet and storing items, and a connection cup holder for connecting to a seat of the vehicle; wherein the connection cup holder is detachably connected to the storage box; the storage box comprises a container body and a lid; an end of the lid is hingedly connected to the container body through a lid bearing; a hidden tensile clamp arm structure is arranged in the lid for clamping the tablet; a bottom bracket is arranged on a lower end of the lid for supporting the tablet; the connection cup holder is arranged with an extension arm, and the extension arm is adjustable to lock the connection cup holder into a saucer with different sizes of the seat.

2. The seat organizer bracket according to claim 1, wherein the hidden tensile clamp arm structure comprises a clamp body, a clamp arm, and a tension spring; an end of the tension spring is connected to the lid, and the other end of the tension spring is connected to a tension spring fixing post arranged in the clamp body; the clamp arm is hingedly connected to an outer end of the clamp body through a clamp body bearing and a torsion spring.

3. The seat organizer bracket according to claim 2, wherein the lid comprises a lid body and a front plate, and the front plate is snap-connected to the lid body.

4. The seat organizer bracket according to claim 3, wherein an inner wall of the lid body is arranged with a plurality of slant top female-fasteners, around an edge of the inner wall, for the front plate to be snap-locked, and a front end of the lid body defines a lid outlet configured for the clamp body to be stretched from.

5. The seat organizer bracket according to claim 4, wherein the lid outlet is arranged with a magnet slot on each of both sides of the lid outlet, with a magnet block embedded in the magnet slot.

6. The seat organizer bracket according to claim 5, wherein a front port of the container body is arranged with an iron block slot, and an iron block is arranged in the iron block slot.

7. The seat organizer bracket according to claim 4, wherein a back surface of the front plate is arranged with a guide rail for guiding the clamp body to stretch, and a lower end of the back surface of the front plate is arranged with another tension spring fixing post located in the middle along a width of the guide rail; the back surface of the front plate is further arranged with a plurality of slant top male-fasteners, near an edge of the back surface, that are matched to be snap-connected with the plurality of slant top female-fasteners; a guide post is arranged in the middle of an inner wall of the lid body for restricting a displacement of the clamp body, and the guide post is fixedly connected to the front plate by means of a self-tapping screw.

8. The seat organizer bracket according to claim 1, wherein the connection cup holder comprises a cup holder, a knob, an extension arm, and a container connector; the extension arm is arranged on a circumference of the cup holder and is extendable inwardly and outwardly, the knob is rotatably arranged on an upper end of the cup holder and is configured to drive the extension arm to extend inwardly and outwardly, and the container connector is screwed and fixed to a top of the cup holder.

9. The seat organizer bracket according to claim 8, wherein an upper end of the container connector is arranged with a connector female-fastener and a latch notch, the latch notch being interconnected with the connector female-fastener, and the connector female-fastener is further arranged with a latch tab.

10. The seat organizer bracket according to claim 9, wherein a connection port is arranged at a bottom of a front end of the container body to be connected with the container connector, and an inner wall of the connection port is arranged with a connector male-fastener.

\* \* \* \* \*